United States Patent
Lee et al.

(10) Patent No.: US 6,509,939 B1
(45) Date of Patent: Jan. 21, 2003

(54) HYBRID SWITCHING MODE LIQUID CRYSTAL DISPLAY DEVICE AND METHOD OF MANUFACTURING THEREOF

(75) Inventors: Jae Kyun Lee, Anyang (KR); Chang Wook Han, Seoul (KR)

(73) Assignee: LG. Philips LCD Co., LTD (KR)

( * ) Notice: Subject to any disclaimer, the term of this patent is extended or adjusted under 35 U.S.C. 154(b) by 0 days.

(21) Appl. No.: 09/348,704

(22) Filed: Jul. 7, 1999

(30) Foreign Application Priority Data

Jul. 7, 1998 (KR) ............................................. 98-27249

(51) Int. Cl.⁷ ............................................. G02F 1/1368
(52) U.S. Cl. ........................ 349/39; 349/43; 349/110; 349/139; 349/141
(58) Field of Search ......................... 349/38, 43, 139, 349/141, 39, 143, 110; 257/57, 72

(56) References Cited

U.S. PATENT DOCUMENTS

| | | | |
|---|---|---|---|
| 4,239,346 A | 12/1980 | Lloyd | 350/334 |
| 4,726,659 A | 2/1988 | Conrad et al. | 350/341 |
| 5,307,189 A | 4/1994 | Nishiki et al. | 359/59 |
| 5,321,535 A | 6/1994 | Ukai et al. | 359/55 |
| 5,459,596 A | 10/1995 | Ueda et al. | 359/59 |

(List continued on next page.)

FOREIGN PATENT DOCUMENTS

| | | |
|---|---|---|
| EP | 0 368 260 | 5/1990 |
| EP | 0 588 568 | 9/1993 |
| EP | 0 749 029 | 12/1996 |
| JP | 60-158421 | 8/1985 |
| JP | 62-078532 | 4/1987 |

(List continued on next page.)

OTHER PUBLICATIONS

S. Matsumoto, Display Characteristics of In–Plane Switching (IPS) LCDs and a Wide–Viewing–Angle 14.5–in. IPS TFT–LCD; Euro Display '96, pp. 445–448.

H. Wakemoto, "An Advanced In–Plane–Switching Mode", TFT–LCD, 1997 SID Digest, pp. 929–932.

M–Oh–e, "Principles and Characteristics of Electro–Optical Behaviour with In–Plane Switching Mode", Asia Display '95, pp. 577–580.

M. Ohta, "Development of Super–TFT–LCDs With In–Plane Switching Display Mode", 1995, Asia Display '95, pp. 707–710.

(List continued on next page.)

*Primary Examiner*—Kenneth Parker
*Assistant Examiner*—Tai Duong
(74) *Attorney, Agent, or Firm*—McKenna Long & Aldridge LLP

(57) ABSTRACT

A hybrid switching mode liquid crystal display device according to the present invention comprises first and second substrates, a gate bus line and a transparent data bus line defining unit pixel region, a common line parallel to a gate bus line in the pixel region, a TFT on the cross of a data bus line and the gate bus lines in the pixel region, a common electrode and a storage capacitor line in the pixel region, a gate insulator having holes on the gate bus line, the common electrode, and the storage capacitor lines, a passivation layer having holes on the gate insulator, a first alignment layer with a fixed alignment direction on the passivation layer, at least one counter electrode on the second substrate applying vertical and inclined electric fields with the common and data electrodes on the first substrate, a black matrix on the counter electrodes to prevent light leakage which may be generated around TFT, the gate bus lines, and the data bus lines, a color filter layer on the black matrix and the second substrate, a second alignment layer on the color filter layer, and a liquid crystal layer between the first and second substrates.

15 Claims, 8 Drawing Sheets

U.S. PATENT DOCUMENTS

| | | | |
|---|---|---|---|
| 5,464,669 A | 11/1995 | Kang et al. .................... 428/1 |
| 5,492,762 A | 2/1996 | Hirai et al. ................ 428/447 |
| 5,576,858 A | 11/1996 | Ukai et al. .................... 359/59 |
| 5,598,285 A | 1/1997 | Kondo et al. ................ 349/39 |
| 5,600,464 A | 2/1997 | Ohe et al. ................... 349/123 |
| 5,602,662 A | 2/1997 | Rosenblatt et al. ......... 349/130 |
| 5,608,556 A | 3/1997 | Koma ........................ 349/143 |
| 5,646,705 A | 7/1997 | Higuchi et al. ............. 349/143 |
| 5,648,674 A | 7/1997 | Weisfield et al. |
| 5,686,019 A | 11/1997 | Nakamura ............. 252/299.01 |
| 5,737,051 A | 4/1998 | Kondo et al. ............... 349/141 |
| 5,742,369 A | 4/1998 | Mihara et al. .............. 349/123 |
| 5,745,207 A | 4/1998 | Asada et al. ................ 349/141 |
| 5,757,455 A | 5/1998 | Sugiyama et al. .......... 349/129 |
| 5,760,856 A | 6/1998 | Yanagawa et al. ............ 349/141 |
| 5,760,857 A | 6/1998 | Yanagawa et al. ............ 349/43 |
| 5,786,876 A | 7/1998 | Ota et al. .................... 349/42 |
| 5,793,459 A | 8/1998 | Toko ......................... 349/128 |
| 5,818,560 A | 10/1998 | Kouno et al. |
| 5,831,701 A | 11/1998 | Matsuyama et al. ........ 349/110 |
| 5,841,499 A | 11/1998 | Baur et al. .................. 349/141 |
| 5,852,485 A | 12/1998 | Shimada et al. ............ 349/141 |
| 5,859,682 A | 1/1999 | Kim et al. .................. 349/124 |
| 5,870,160 A | 2/1999 | Yanagawa et al. .......... 349/141 |
| 5,886,762 A | 3/1999 | Lee et al. ................... 349/141 |
| 5,907,380 A | 5/1999 | Lien ........................... 349/141 |
| 5,910,271 A | 6/1999 | Ohe et al. .............. 252/299.01 |
| 5,914,762 A | 6/1999 | Lee et al. ................... 349/141 |
| 5,946,060 A * | 8/1999 | Nishiki et al. .............. 349/141 |
| 5,946,067 A | 8/1999 | Kim et al. .................. 349/141 |
| 5,956,111 A | 9/1999 | Ohta et al. .................. 349/141 |
| 5,959,708 A | 9/1999 | Lee et al. ................... 349/143 |
| 5,969,782 A | 10/1999 | Lee et al. ................... 349/141 |
| 5,977,562 A | 11/1999 | Hirakata et al. .............. 257/72 |
| 5,995,186 A | 11/1999 | Hiroshi ...................... 349/141 |
| 6,005,650 A | 12/1999 | Kim et al. .................. 349/130 |
| 6,040,887 A | 3/2000 | Matsuyama et al. ........ 349/141 |
| 6,091,473 A | 7/2000 | Hebiguchi |
| 6,281,957 B1 * | 8/2001 | Oh et al. .................... 349/141 |
| 6,297,867 B1 * | 10/2001 | Miyahara et al. ........... 349/141 |
| 6,300,995 B1 * | 10/2001 | Wakagi et al. .............. 349/141 |

FOREIGN PATENT DOCUMENTS

| | | |
|---|---|---|
| JP | 1-100518 | 4/1989 |
| JP | 4-57032 | 2/1992 |
| JP | 04-067127 | 3/1992 |
| JP | 4-194823 | 7/1992 |
| JP | 4-371928 | 12/1992 |
| JP | 06-160878 | 6/1994 |
| JP | 06-273803 | 9/1994 |
| JP | 07-036058 | 2/1995 |
| JP | 07-134301 | 5/1995 |
| JP | 07-225388 | 8/1995 |
| JP | 08-062586 | 3/1996 |
| JP | 09-005763 | 1/1997 |
| JP | 09-005764 | 1/1997 |
| JP | 09-005793 | 1/1997 |
| JP | 09-033946 | 2/1997 |
| JP | 09-043589 | 2/1997 |
| JP | 09-043590 | 2/1997 |
| JP | 09-101538 | 4/1997 |
| JP | 09-105908 | 4/1997 |
| JP | 09-105918 | 4/1997 |
| JP | 09-258269 | 10/1997 |
| JP | 09-269507 | 10/1997 |
| JP | 09-325346 | 12/1997 |
| KR | 96-32049 | 9/1996 |
| KR | 97-22458 | 5/1997 |
| KR | 98-040330 | 8/1998 |
| KR | 98-083765 | 12/1998 |
| WO | 97-10530 | 3/1997 |

OTHER PUBLICATIONS

S. H. Lee, "High–Transmittance, Wide–Viewing–Angle Nematic Liquid Crystal Display Controlled by Fringe–Field Switching", Asia Display '98, pp. 371–374.

R. Kiefer, "In–Plane Switching of Nematic Liquid Crystals", Japan Display '92 pp. 547–550.

U.S. patent application Ser. No. 09/365,634, Hiroshi, filed Aug. 1999.

U.S. patent application Ser. No. 08/880,068, Hiroshi, filed Jun. 1997.

U.S. patent application Ser. No. 09/143,624, Shin et al., filed Aug. 1998.

U.S. patent application Ser. No. 09/079,894, Seo, May 1998.

U.S. patent application Ser. No. 09/613,730, Hiroshi, filed Jul. 2000.

U.S. patent application Ser. No. 09/079,895, Oh, filed May 1998.

U.S. patent application Ser. No. 09/348,704, Lee et al., filed Jul. 1999.

U.S. patent application Ser. No. 09/134,405, Ham, filed Aug. 1998.

U.S. patent application Ser. No. 09/149,746, Seo, filed Sep. 1998.

U.S. patent application Ser. No. 09/235,205, Seo et al., filed Jan. 1999.

U.S. patent application Ser. No. 09/271,153, Son et al., filed Mar. 1999.

* cited by examiner

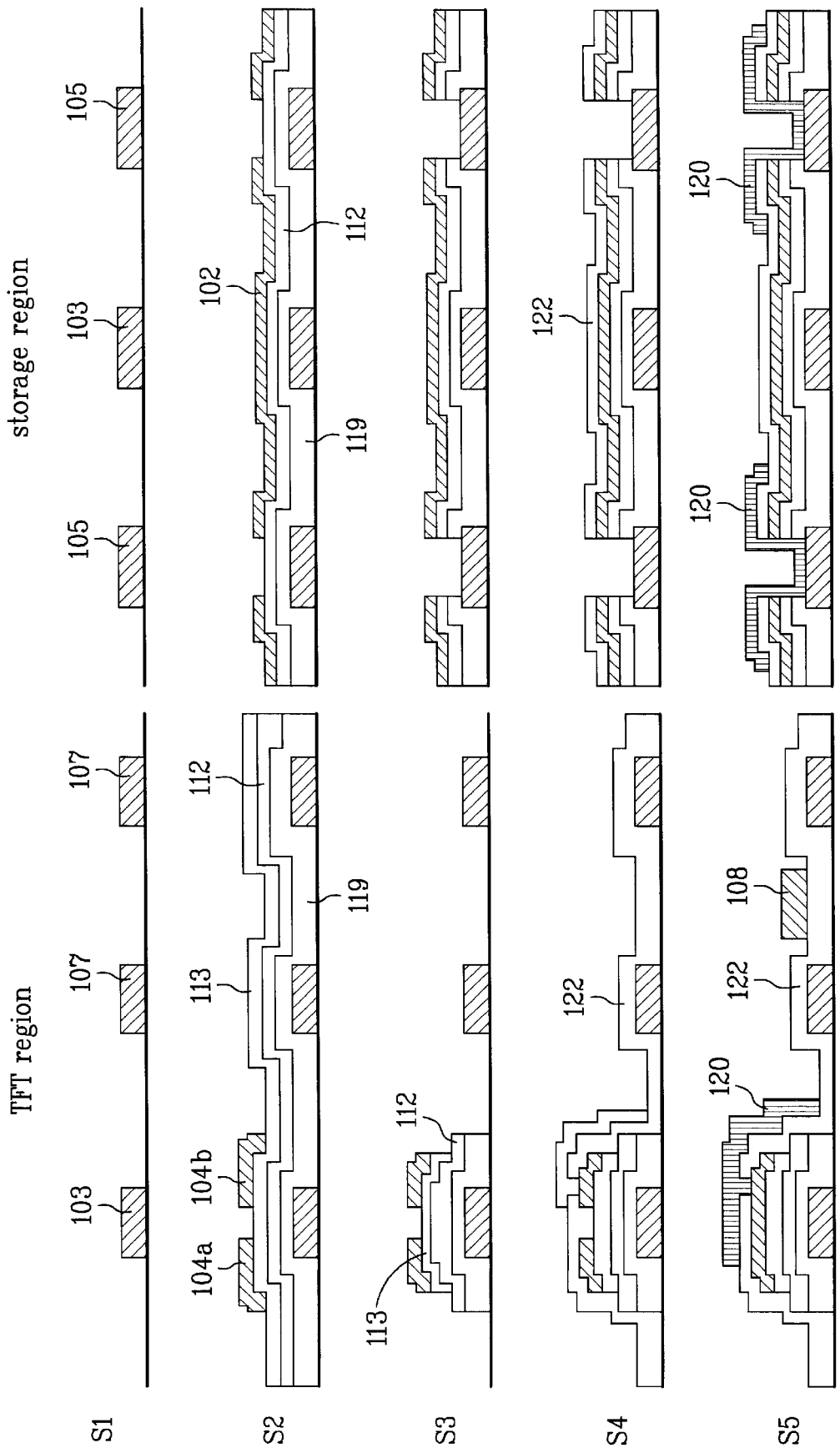

HYBRID SWITCHING MODE LIQUID CRYSTAL DISPLAY DEVICE AND METHOD OF MANUFACTURING THEREOF

This application claims the benefit of Korean Patent Application No. 1998-27249, filed on Jul. 7, 1998, which is hereby incorporated by reference.

BACKGROUND OF THE INVENTION

1. Field of Invention

The present invention relates to a liquid crystal display device and, more particularly, to a hybrid switching mode liquid crystal display device having a high aperture ratio and a method of manufacturing thereof.

2. Discussion of Related Art

Since twisted nematic liquid crystal display devices (TN LCDs) have a high image quality and a low electric power consumption, they are widely applied to flat panel display device. TN LCDs, however, have a narrow viewing angle due to refractive anisotropic of liquid crystal molecules. This is caused by horizontally aligned liquid crystal molecules before voltage is applied are nearly vertically aligned with respect to a substrate when voltage is applied to a liquid crystal panel.

Recently, in-plane switching mode liquid crystal display devices (IPS-LCDs) are widely studied in which viewing angle characteristic is improved and these liquid crystal molecules are nearly horizontally aligned.

FIG. 1A is a plan view of a unit pixel of a conventional in-plane switching mode active matrix LCD. FIG. 1B is a sectional view according to line I–I' of FIG. 1A.

Referring to the drawings, an unit pixel region is defined by a gate bus line 1 and a data bus line 2 in which the lines are arranged perpendicularly and/or horizontally as a matrix shape on a first substrate 10. A common line 16 is arranged parallel to the gate bus line 1 in the pixel region and the thin film transistor (TFT) is formed on a cross of the data bus line 2 and the gate bus line 1. The TFT includes a gate electrode 3, a gate insulator 19, a semiconductor layer 12, an ohmic contact layer 13, and source/drain electrodes 4a, 4b in which the gate electrode 3 is connected to the gate bus line 1, and source/drain electrodes 4a, 4b are connected to the data bus line 2, and the gate insulator 19 is formed on the entire surface of the first substrate 10.

A common electrode 7 and a data electrode 8 are formed in the pixel region. The common electrode 7 is formed with the gate electrode 3 and connected to the common line 16, and the data electrode 8 is formed with the source/drain electrodes 4a, 4b and electrically connected to them. Further, a passivation layer 22 and a first alignment layer (not illustrated) are deposited on the entire surface of the first substrate 10.

On a second substrate 11, a black matrix 15 is formed to prevent a light leakage which may be generated around a TFT, the gate bus line 1, and the data bus line 2. A color filter layer 25, and a second alignment layer (not illustrated) is formed on the black matrix 15 in sequence. Also, a liquid crystal layer 30 is formed between the first and second substrates 10, 11.

When voltage is not applied to LCD having the above structure, liquid crystal molecules in the liquid crystal layer 30 are aligned according to alignment directions of the first and second alignment layers, but when voltage is applied between the common electrode 7 and the data electrode 8, the liquid crystal molecules are aligned parallel to extending directions of the common and data electrode. As the foregoing, since liquid crystal molecules in the liquid crystal layer 30 are switched on the same plane at all times, grey inversion is not created in the viewing angle directions of up and down, and right and left directions.

FIG. 2A is a plan view of the part forming the storage capacitor line of the conventional LCD. FIG. 2B is a sectional view according to line II–II' of FIG. 2A.

Referring to the drawings, the gate insulator 19 and the semiconductor layer 12 are deposited on the gate electrode 3 and a storage capacitor line 5. The data bus line 2 is coupled to the storage capacitor line 5 through a hole 18 of the gate insulator 19 and formed with the source/drain electrodes 4a, 4b of FIG. 1A. A method for manufacturing the LCD having above structure is described in FIG. 3.

A TFT region describes a sectional region according to line I–I' of FIG. 1A, and a storage region describes a sectional region according to line II–II' of FIG. 2A.

As shown in the drawing, a method of manufacturing the conventional LCD comprises the steps of patterning the gate electrode 8, the common electrode 7, and the storage capacitor line 5 (S1), patterning the semiconductor layer 12 and the ohmic contact layer 13 after forming the gate insulator 19, the semiconductor layer 12, and the ohmic contact layer 13 on the gate electrode 3 (S2), forming the hole 18 by opening some part of the gate insulator 19 in the part forming the storage capacitor line 5 (S3), patterning the source/drain electrodes 4a, 4b, the data electrode 8, and the data bus line 2 on the ohmic contact layer 13 and the gate insulator 19 (S4), forming the passivation layer 22 after n+ dry etching (S5).

However, in the conventional LCD, it is necessary that each of the storage capacitor lines and pad open regions are formed respectively, and the storage capacitor lines are coupled to each other by the data bus line when the gate insulator is patterned to form the storage capacitor line.

SUMMARY OF THE INVENTION

An object of the present invention is to provide a hybrid switching mode LCD having a high opening ratio due to transparent connecting parts for connecting to an outer driving circuit by etching a passivation layer/pad at the same time thereby forming a storage capacitor line, and a method of manufacturing thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the above object, a hybrid switching mode LCD according to the present invention comprises first and second substrates, transparent data bus lines and gate bus lines defining a pixel region on the first substrate in which the lines are arranged perpendicularly and/or horizontally as a matrix shape, especially the transparent data bus lines made of, for example, ITO (indium tin oxide) has holes, common lines formed parallel to the gate bus lines in the pixel region, TFTs on the cross of the data bus lines and the gate bus lines in the pixel region, common electrodes and storage capacitor lines in pixel region, a gate insulator having holes on the gate bus lines, the common electrodes, and the storage capacitor lines, a passivation layer having holes on the gate insulator, a first alignment layer with a fixed alignment direction on the passivation layer, at least one counter electrode on the second substrate thereby applying vertical and inclined electric fields with the common and data electrodes on the first substrate, black matrixes on the counter electrodes to prevent a light leakage which may be generated around TFTs, the gate bus lines, and the data bus lines, a color filter layer on the black matrix and the second substrate, a second alignment layer on the color filter layer, and a liquid crystal layer between the first and second substrates.

A method of manufacturing the above LCD comprises the steps of forming the gate bus lines, the gate electrodes, the common lines, and the storage capacitor lines, depositing an inorganic material, an amorphous silicon, and an impurity amorphous silicon, forming source/drain electrodes and the data electrodes by patterning a metal, forming the gate insulator and the semiconductor layers having holes by etching the inorganic material and amorphous silicon with masks of source/drain electrodes and the metal, forming an ohmic contact layer by etching the impurity amorphous silicon, forming the passivation layer by patterning an organic material or an inorganic material, depositing a transparent metal layer such as ITO for storage capacitor on the gate insulator, the semiconductor layers, and the metal lines, depositing the first alignment layer, forming at least one counter electrode on the second substrate thereby applying vertical and inclined electric fields with the common and data electrodes on the first substrate, forming the black matrixes on the counter electrode, forming a color filter layer on the black matrix and the second substrate, forming the second alignment layer on the color filter layer, and forming the liquid crystal layer between the first and second substrates.

According to another embodiment of the present invention, after forming the gate insulator, the semiconductor layer is patterned and the source/drain electrodes are formed. After that, the passivation layer is deposited after forming the ohmic contact layer by n+ dry etching the impurity amorphous silicon with the mask of the source/drain electrodes. Further, after forming the holes by etching the passivation/pad at the same time, transparent connecting parts for connecting to an outer driving circuit and transparent common electrodes are formed on the holes.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description, serve to explain the principles of the invention.

FIG. 6 is a drawing showing a method according to a first embodiment of the present invention.

DETAILED DESCRIPTION OF THE PREFERRED EMBODIMENTS

Hereinafter, preferred embodiments of the present invention will be described in detail in reference to the accompanying drawings.

Figure 1A:
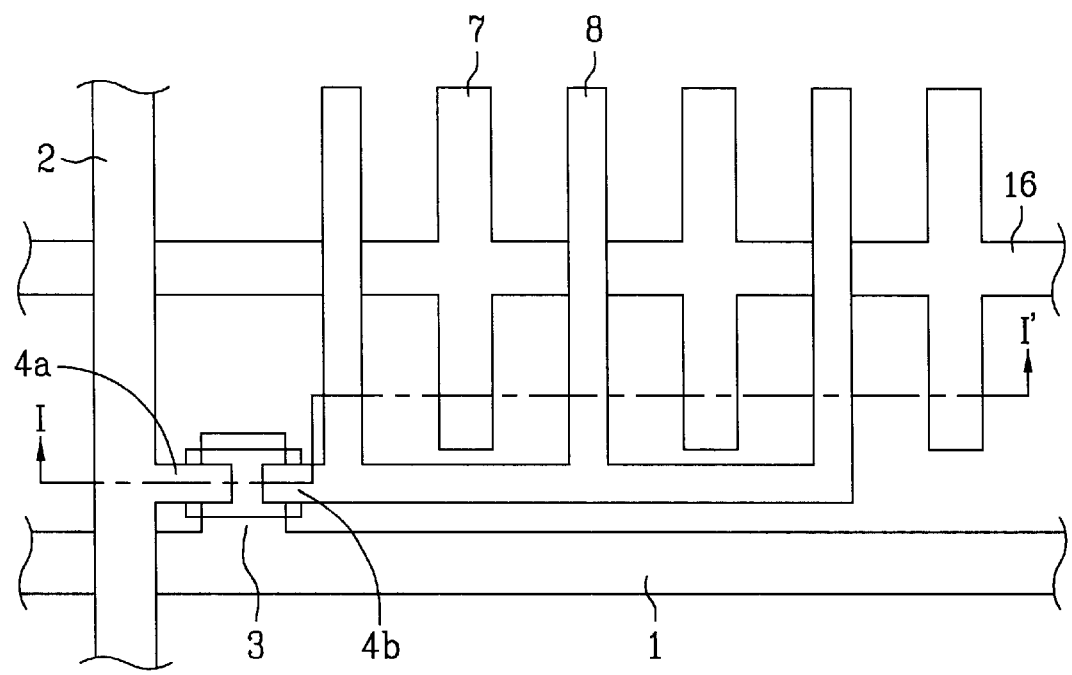
FIG. 1A is a plan view of a unit pixel of a conventional in-plane switching mode active matrix LCD.
Figure 1B:
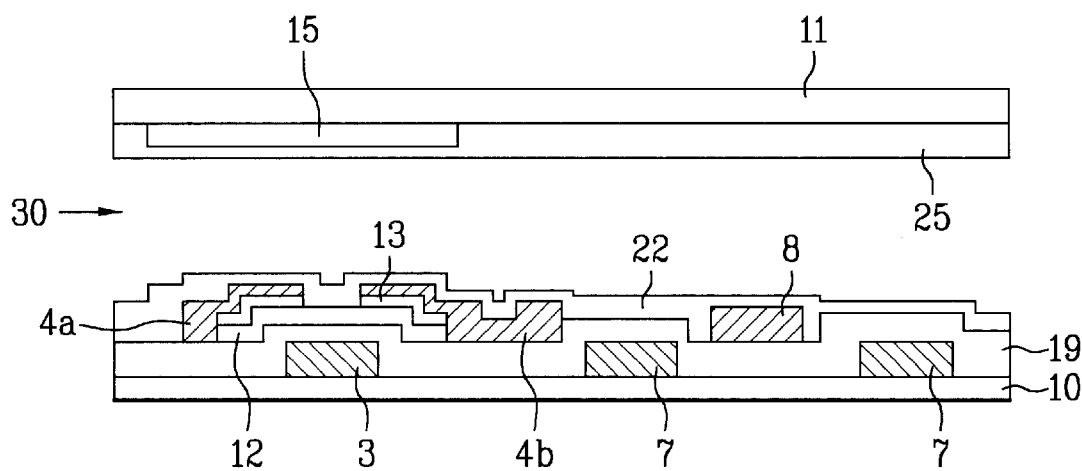
FIG. 1B is a sectional view according to line I–I' of FIG. 1A.
Figure 2A:
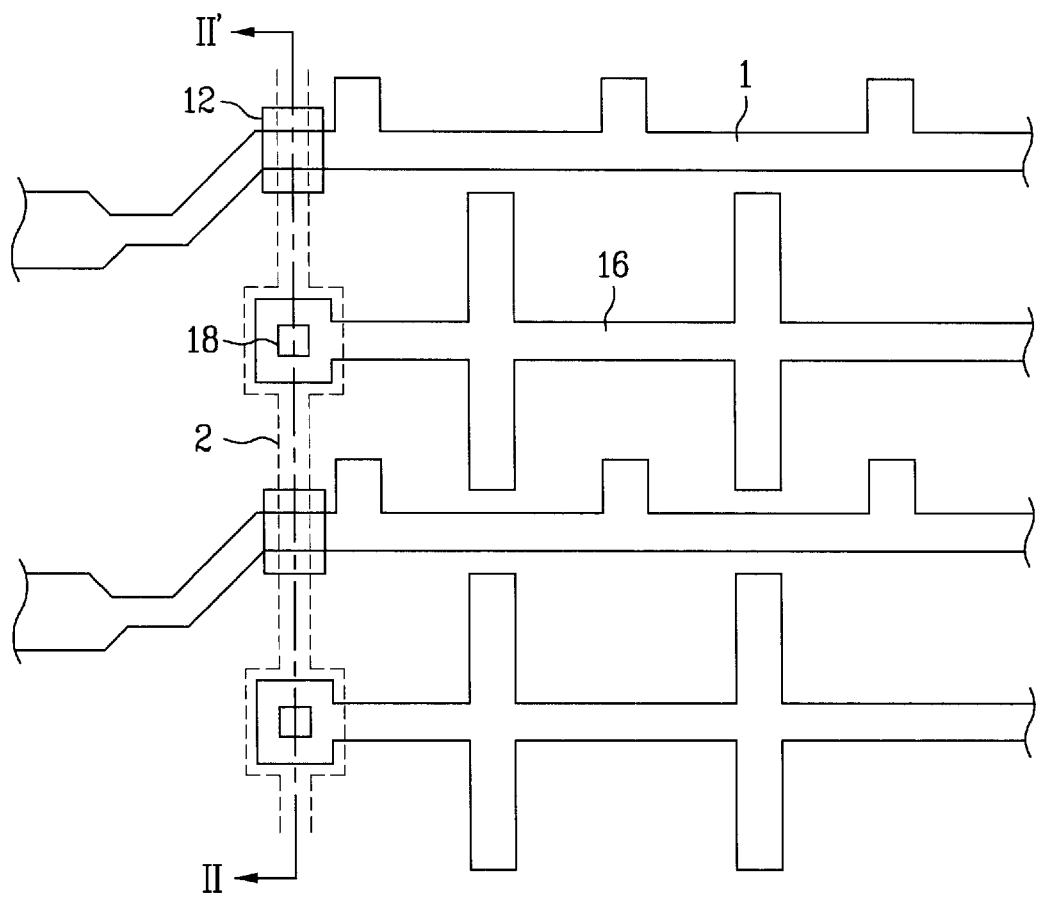
FIG. 2A is a plan view of the part forming the storage capacitor line of the conventional LCD.
Figure 2B:
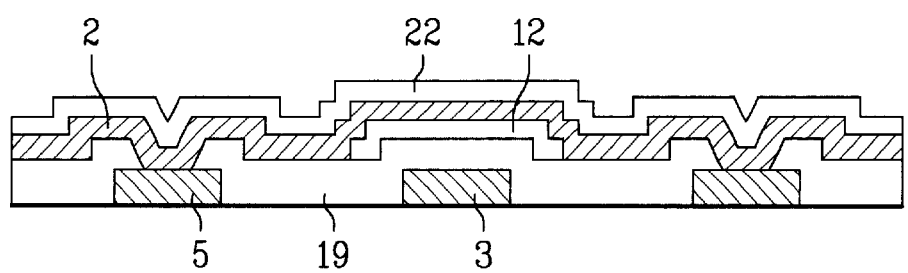
FIG. 2B is a sectional view according to line II–II' of FIG. 2A.
Figure 3:
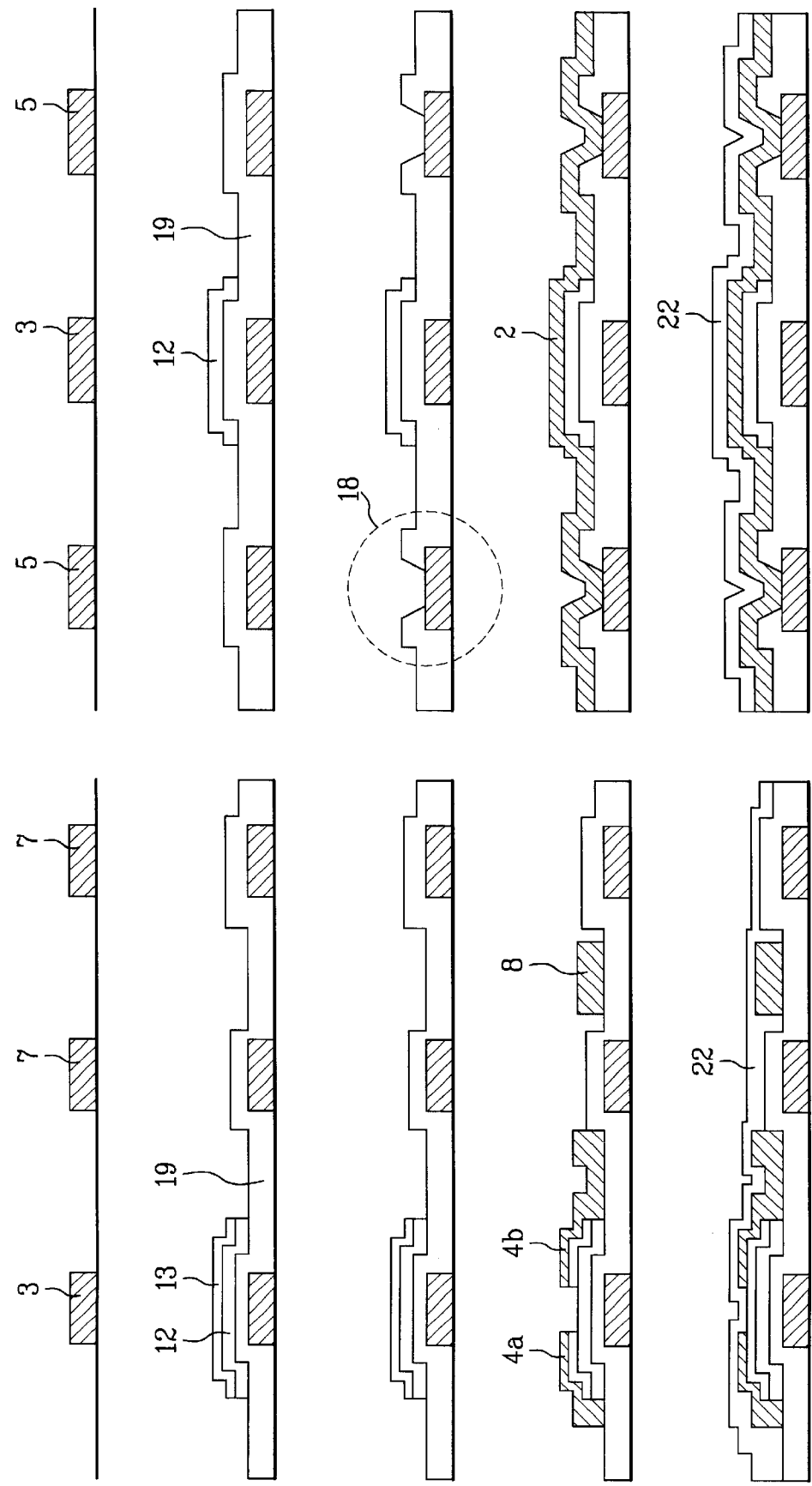
FIG. 3 is a drawing showing a method for manufacturing the conventional LCD.
Figure 4A:
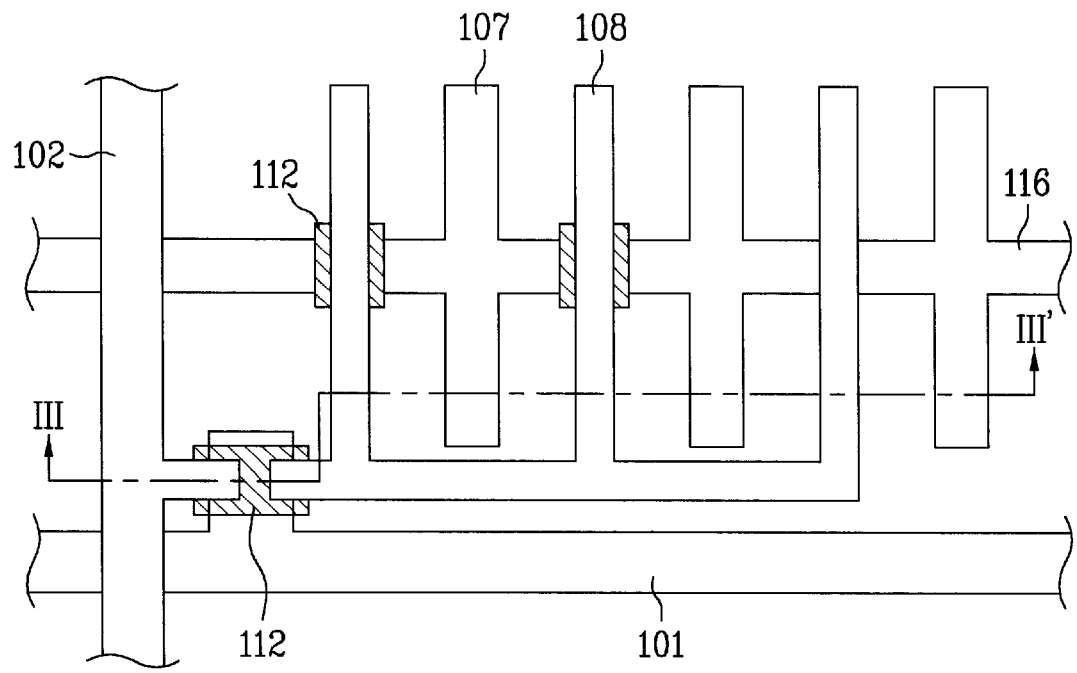
FIG. 4A is a plan view of a unit pixel of a hybrid switching mode active matrix LCD according to the present invention.
Figure 4B:
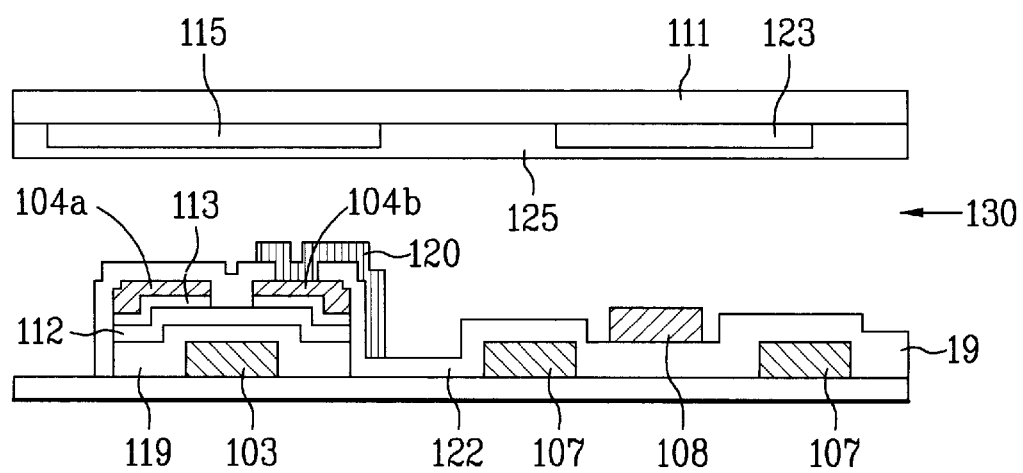
FIG. 4B is a sectional view according to line III–III' of FIG. 4A.

FIG. 4A is a plan view of a unit pixel of a hybrid switching mode active matrix LCD according to the present invention. FIG. 4B is a sectional view according to line III–III' of FIG. 4A. As shown in the drawings, a gate bus line 101 and a transparent data bus line 102 defining pixel region are arranged perpendicularly and/or horizontally as matrix shape on the first substrate 110, common line 116 is formed parallel to the gate bus line 101, TFT is formed on a cross of the data bus line 102 and the gate bus line 101 in pixel region, a gate electrode 103 of TFT is coupled to the gate bus line 101 and a source electrode 104a is coupled to the data bus line 102. In the pixel region, a common electrode 107 and a data electrode 108 are formed parallel to each other. The common electrode 107 is coupled to the common line 116 and the data electrode 108 is coupled to a drain electrode 104b through a transparent metal oxide layer 120.

Although not shown in the drawing, it is possible that the two electrodes 107, 108 are formed on a single layer. Namely, the two electrodes 107, 108 are formed on a gate insulator 119 on the first substrate 110. The common line 116 and the common electrode 107 are formed on the gate insulator 119 or a passivation layer 122 through holes thereon.

A semiconductor layer 112 is formed to prevent a short which is generated between the common line 116 and the data electrode 108 and on a cross point of the gate bus line 101 and the data bus line 102. In addition, a first alignment layer (not illustrated) is formed on the passivation layer 122.

On the second substrate 111, at least one counter electrode 123 applying vertical and inclined electric fields with the common and data electrodes 107, 108 is formed. A black matrix 115 for preventing light leakage, which may be generated around TFTs, the gate bus lines, and the data bus lines, is formed on the counter electrodes. A color filter layer 125 including color filter elements of R, G, and B is formed on the black matrix 115. A second alignment layer (not illustrated) is formed on the color filter layer 125. A liquid crystal layer is formed between the first and second substrates.

Between the color filter layer 125 and the second alignment layer, an overcoat layer may be formed. Further, the black matrix may function as a common electrode.

Figure 5A:
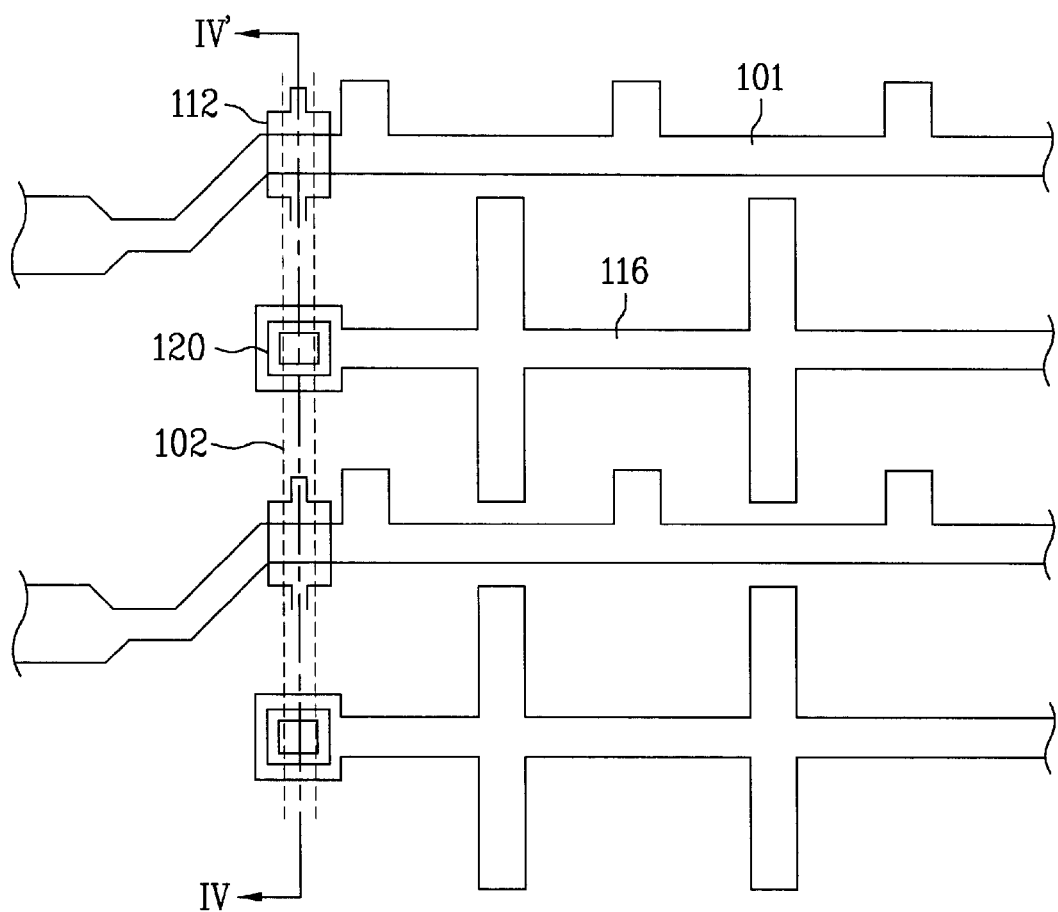
FIG. 5A is a plan view of the part forming the storage capacitor line of the present invention.
Figure 5B:
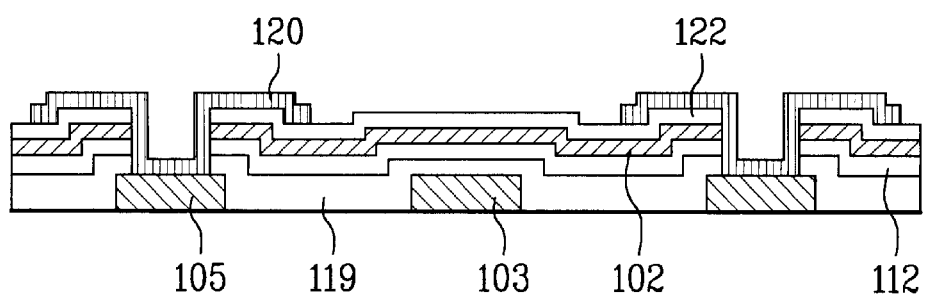
FIG. 5B is a sectional view according to line IV–IV' of FIG. 5A.
Figure 5C:
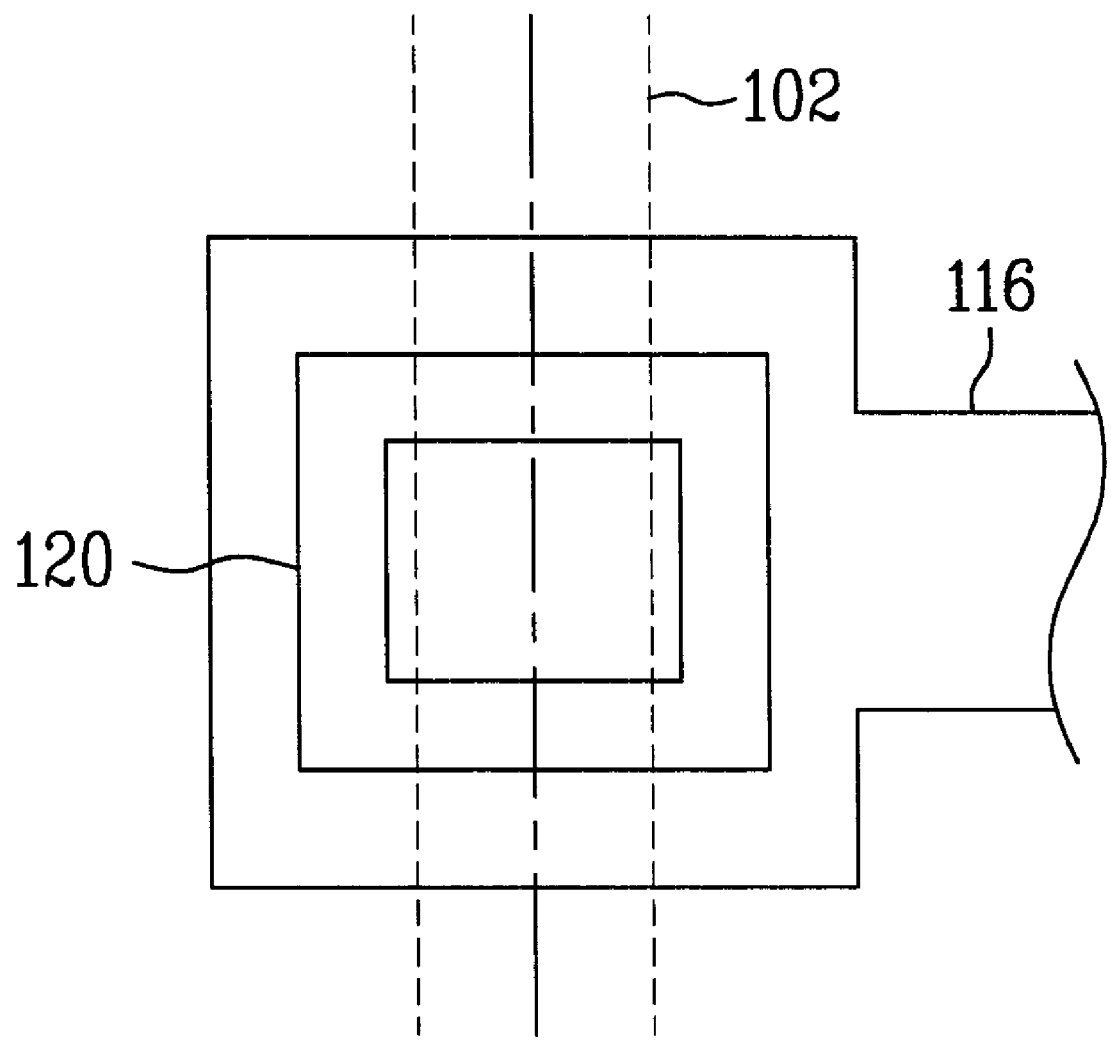
FIG. 5C is a partial plan view of FIG. 5A.

FIG. 5A is a plan view of the part forming the storage capacitor line of FIG. 4A. FIG. 5B is a sectional view according to line IV–IV' of FIG. 5A. FIG. 5C is a partial plan view of FIG. 5A. Referring to the drawings, the gate insulator 119, the semiconductor layer 112, and the data bus line 102 are deposited on the gate electrode 103 and a storage capacitor line 105. At this time, the data bus line 102 is formed with source/drain electrodes 4a, 4b of FIG. 4A and the passivation layer 122 is formed thereon. In addition, on the data bus line 102, the transparent metal oxide layer 120 connecting the data bus line 102 to the storage capacitor line 105 is formed on the data bus line 102. The passivation layer 122 may be formed on the TFT region only to achieve a strong electric field.

FIG. 6 is a drawing showing a method according to a first embodiment of the present invention. Referring to the drawing, the TFT region describes a sectional region according to line III–III' of FIG. 4A, and the storage region describes a sectional region according to line IV–IV' of FIG. 5A. As shown in the drawing, firstly, the gate electrode 103, the common electrode 107, and the storage capacitor line 105 are formed by depositing and etching a metal such as Ta, Al, Cr, Mo, or Al alloy using a sputtering method (S1). Although not shown in the drawing, the gate bus line and the common line are formed at the same time. At this time, it is possible to form an anodic oxidation layer by anodizing the gate electrode 103 and the common electrode 107 to improve the insulating characteristic.

The source/drain electrodes 104a, 104b are formed after deposing an inorganic material such as SiNx or SiOx, an amorphous silicon, and an impurity amorphous silicon by PCVD (plasma chemical vapor deposition) method, and patterning the data bus line 102 in order to have holes (S2). The ohmic contact layer 113 is formed continually by patterning the gate insulator 119 and the semiconductor layer 112 with masks of the data bus line 102 and the source/drain electrodes 104a, 104b, and etching the impurity amorphous silicon layer (S3). After the passivation layer 122 is formed by depositing and etching an inorganic material such as SiNx or SiOx, or an organic material such as BCB (benzocyclobutene) (S4), the storage capacitor line 105 and the data bus line 102 are coupled to each other electrically by depositing a transparent metal oxide such as ITO on the holes of the gate insulator 119, the semiconductor layer 112, and the data bus line 102 (S5). Further more, an etch stopper may be formed on the semiconductor layer 112 to prevent channel region from etching. The first alignment layer (not illustrated) is formed on the passivation layer 122.

On the second substrate 111, although not shown in the drawing, at least one counter electrode applying vertical and inclined electric fields with the common and data electrodes 107, 108 is formed. The black matrix for preventing light leakage, which may be generated around TFTs, the gate bus lines, and the data bus lines, a color filter layer, and a second alignment layer, are formed in sequence, and in a liquid crystal layer formed between the first and second substrates.

Each alignment direction of the first and second alignment layers is determined by a rubbing method using polyamide, polyimide, SiO2, PVA (polyvinylalcohol) or polyamic acid, or by a photo-alignment method using photosensitive material such as PVCN (polyvinylcinnamate), PSCN (polysiloxanecinnamate) or CelCN (cellulosecinnamate).

Figure 7:
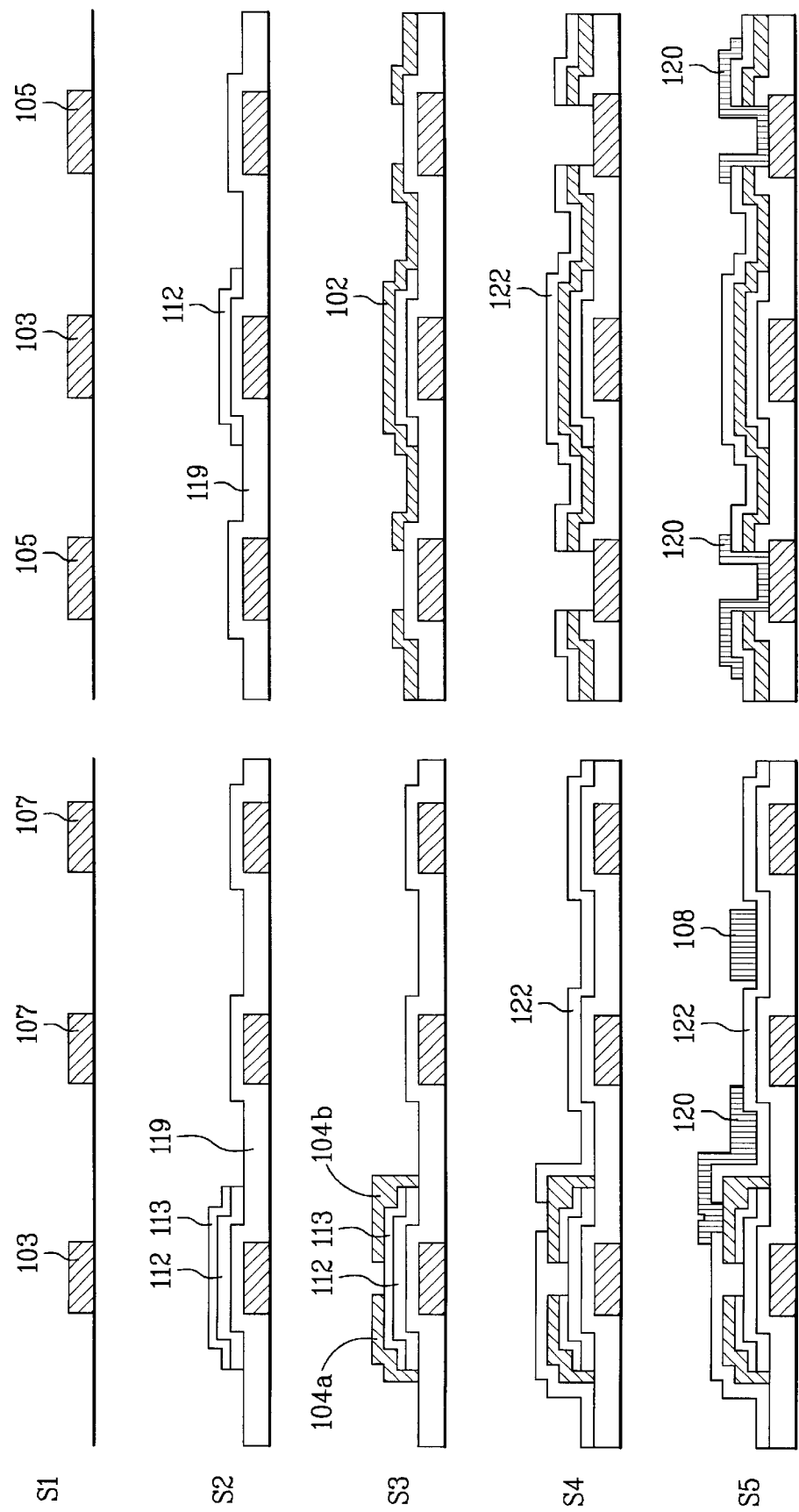
FIG. 7 is a drawing showing a method according to a second embodiment of the present invention.

FIG. 7 is a drawing showing a method according to a second embodiment of the present invention. The difference between the first embodiment and the second embodiment is that the gate insulator is formed on the entire surface of the first substrate and the semiconductor layer is patterned selectively.

Referring to the drawing, a TFT region describes a sectional region according to line III–III' of FIG. 4A, and a storage region describes a sectional region according to line IV–IV' of FIG. 5A.

As shown in the drawings, firstly, the gate electrode 103, the common electrode 107, and the storage capacitor line 105 are formed by depositing and etching a metal such as Ta, Al, Cr, Mo, or Al alloy using a sputtering method (S1). Although not shown in the drawing, the gate bus line and the common line are formed at the same time. At this time, it is possible to form an anodic oxidation layer by anodizing the gate electrode 103 and the common electrode 107 to improve the insulating characteristic.

The gate insulator 119 is formed on the entire surface of the first substrate 110 by depositing an inorganic material such as SiNx or SiOx, and the semiconductor layer 112 and the ohmic contact layer 113 are formed by depositing and patterning an amorphous silicon, and an impurity amorphous silicon by PCVD (plasma chemical vapor deposition) method (S2).

The source/drain electrodes 104a, 104b and the data bus line 102 are patterned (S3). The passivation layer 122 is formed continually by depositing and etching an inorganic material such as SiNx or SiOx, or an organic material such as BCB (benzocyclobutene) with masks of the source/drain electrodes 104a, 104b after n+ dry etching the ohmic contact layer 113 (S4).

After forming the passivation layer 122, the storage capacitor line 105 and the data bus line 102 are coupled to each other electrically by depositing a transparent metal oxide such as ITO on the holes of the gate insulator 119, the semiconductor layer 112, and the data bus line 102 (S5). At this time, some part of the passivation layer 122 and the gate insulator 119 on the storage region are etched at the same time.

According to the present invention, it is possible to obtain a hybrid switching mode LCD having a high opening ratio due to transparent connecting parts for connecting to an outer driving circuit by etching a passivation layer/pad at the same time thereby forming a storage capacitor line.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A hybrid switching mode liquid crystal display device comprising:

first and second substrates;

a plurality of gate and data bus lines defining pixel regions and arranged perpendicularly and/or horizontally on said first substrate;

a common line parallel to said gate bus line;

a plurality of thin film transistors formed on cross points of said gate and data bus lines;

at least one pair of common electrode and transparent data electrode;

a plurality of storage capacitor lines on a plane of said common electrode;

a passivation layer on said first substrate;

a transparent metal oxide layer for connecting said data bus lines to said storage capacitor lines;

at least one counter electrode on said second substrate to apply vertical and inclined electric fields with said common and data electrodes;

a liquid crystal layer between said first substrate and said second substrate; and at least one alignment layer on said two substrates.

2. The hybrid switching mode liquid crystal display device according to claim 1, wherein each of thin film transistors includes a gate electrode connected to said gate bus line and said common electrode, a gate insulator having a contact hole on said gate electrode, a semiconductor layer having a contact hole on said gate insulator, an ohmic contact layer on said semiconductor layer, and source/drain electrodes on said ohmic contact layer.

3. The hybrid switching mode liquid crystal display device according to claim 1, wherein said transparent metal oxide layer includes indium tin oxide.

4. The hybrid switching mode liquid crystal display device according to claim 1, further comprising a black matrix for preventing a light leakage being generated around said thin film transistors, said gate bus lines, and said data bus lines.

5. A liquid crystal display device comprising:

first and second substrates;

a plurality of gate and data bus lines on said first substrate;

a common line parallel to said gate bus line;

plurality of thin film transistors adjacent a crossing area of said gate and data bus lines;

a common electrode on said first substrate;

a passivation layer on said first substrate;

a transparent data electrode on said passivation layer; and a transparent metal oxide layer for connecting said data bus lines to capacitor storage lines on said first substrate; and a liquid crystal layer between said first substrate and said second substrate.

6. The device of claim 5, wherein said storage capacitor lines are on a plane of said common electrode.

7. The device of claim 6, wherein said storage capacitor lines comprise:

a gate electrode connected to said gate bus lines and said common electrode;

a gate insulator having a contact hole on said gate electrode;

a semiconductor layer having a contact hole on said gate insulator;

an ohmic contact layer on said semiconductor layer; and source and drain electrodes connected to said data bus lines and said data electrode on said ohmic contact layer.

8. The device of claim 5, wherein said data electrode includes indium tin oxide.

9. The device of claim 5, further comprising at least one counter electrode on said second substrate to apply vertical and inclined electric fields with said common and data electrodes.

10. The device of claim 5, further comprising an alignment layer on at least one of said first and second substrates.

11. A liquid crystal display device comprising:

first and second substrates;

a plurality of gate and data bus lines on said first substrate;

a common line parallel to said gate bus line;

a plurality of thin film transistors adjacent a crossing area of said gate and data bus lines;

at least one pair of common and data electrodes on said first substrate;

a plurality of storage capacitor lines on a plane of said common electrode;

a passivation layer on said first substrate;

a transparent metal oxide layer for connecting said data bus lines to said storage capacitor lines; and a liquid crystal layer between said first substrate and said second substrate.

12. The device of claim 11, wherein said transparent metal oxide layer includes indium tin oxide.

13. The device of claim 11, wherein said storage capacitor lines comprise:

a gate electrode connected to said gate bus lines and said common electrode;

a gate insulator having a contact hole on said gate electrode;

a semiconductor layer having a contact hole on said gate insulator;

an ohmic contact layer on said semiconductor layer; and source and drain electrodes connected to said data bus lines and said data elctrode on said ohmic contact layer.

14. The device of claim 11, further comprising at least one counter electrode on said second substrate to apply vertical and inclined electric fields with said common and data electrodes.

15. The device of claim 11, further comprising an alignment layer on at least one of said first and second substrates.

* * * * *